Dec. 4, 1951   J. H. PRATT ET AL   2,577,153
MASTER CYLINDER FOR HYDRAULIC TRANSMISSION SYSTEMS
Filed Feb. 9, 1948
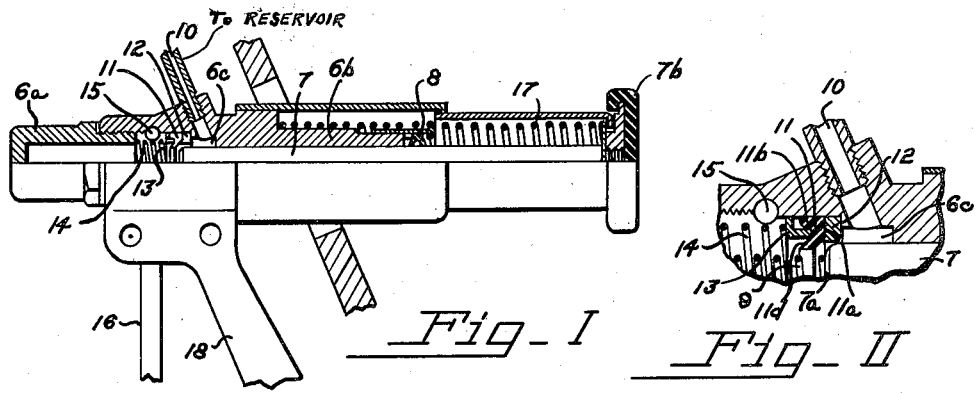
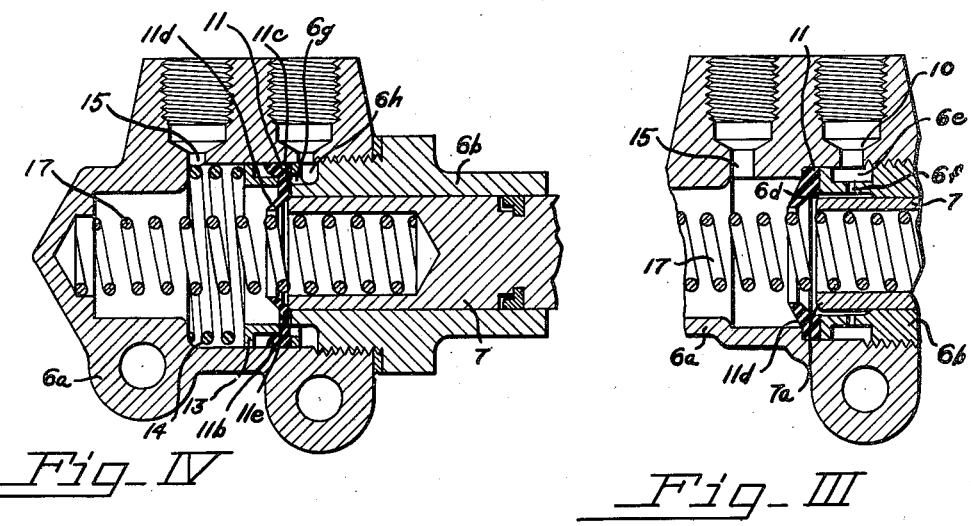
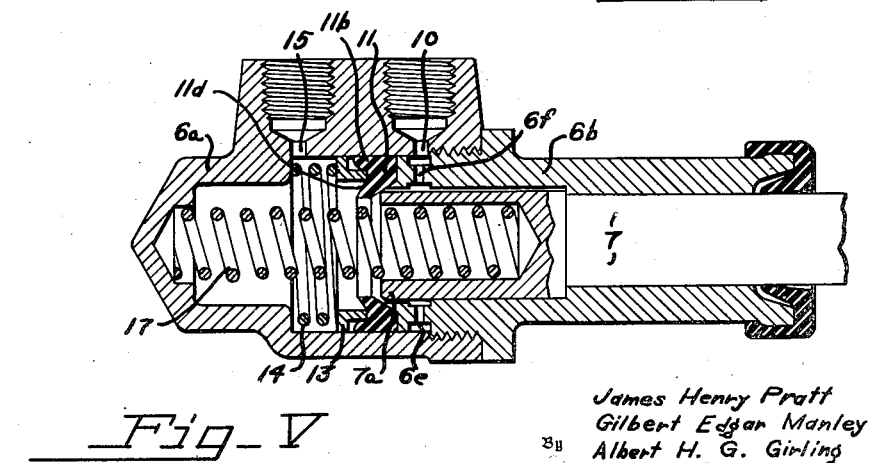
Inventors
James Henry Pratt
Gilbert Edgar Manley
Albert H. G. Girling Patented Dec. 4, 1951

2,577,153

UNITED STATES PATENT OFFICE 2,577,153

MASTER CYLINDER FOR HYDRAULIC TRANSMISSION SYSTEMS

James Henry Pratt, Wythall, Gilbert Edgar Manley, Norton Curlieu, and Albert Henry Godfrey Girling, Redgrave, Diss, England, assignors, by direct and mesne assignments, to Girling Limited, Tyseley, Birmingham, England, a corporation of Great Britain Application February 9, 1948, Serial No. 7,114
In Great Britain August 4, 1939

Section 1, Public Law 690, August 8, 1946
Patent expires August 4, 1959

3 Claims. (Cl. 60—54.6)

This invention has reference to improvements in hydraulic transmission mechanism and is concerned more particularly but not essentially with hydraulic transmission mechanism for use in conjunction with hydraulically operated brakes for vehicles, the invention having for its primary object the provision of an improved hydraulic transmission mechanism for the said purpose which provides a sure and efficient hydraulic control but which is simple in construction and capable of being produced at a relatively low cost.

The invention consists of an improved hydraulic transmission mechanism in which the piston for generating hydraulic pressure co-operates with a relatively fixed hydraulic packing means which is located in advance of a sole means for placing the hydraulic cylinder in communication with a liquid reservoir and in which the association between the fixed hydraulic packing means and the piston is such that the said packing means provides a hydraulic sealing means subsequent to a movement of the piston for generating pressure but is moved out of sealing contact with the piston on the return stroke thereof if the pressure in the cylinder becomes less than atmospheric pressure in order to enable liquid to flow from the aforesaid reservoir into the cylinder irrespective of the position of the piston.

The invention further resides in the details of construction of the improved hydraulic transmission mechanism to be described hereinafter.

A convenient embodiment of the invention will now be described with particular reference to the accompanying drawing which illustrates the invention in its application to a master cylinder for controlling the actuation of hydraulically operated brakes on a motor vehicle.

In the drawing:

Figure I is in a part sectional side elevation of the aforesaid master cylinder and its adjacent parts.

Figure II is a fragmentary view showing on a larger scale the relevant parts of the embodiment of the invention incorporated in Figure I and Figures III to V are fragmentary views illustrating other modifications of the relevant parts of the invention as adapted for incorporation with a master cylinder as illustrated in Figure I.

Like numerals of reference indicate similar or analogous parts in the several views.

According to the embodiment of the invention as illustrated in Figures I and II the improved hydraulic mechanism comprises a cylinder formed in two parts 6a, 6b which have a screwed engagement, one with the other, one of the said parts 6a having a closed end whereas the other part 6b provides a bearing for a hydraulic piston 7 and incorporates at its outer end a hydraulic gland 8 for preventing leakage from the bearing. The wall of the cylinder part 6b adjacent the acting end of the piston 7 when the piston is in the out of action position is of greater diameter than the external diameter of the piston 7 and this portion of the cylinder is provided with an annular groove 6c which is in communication by way of the pipe line 10 with the usual reservoir which is provided for the maintenance of a supply of hydraulic liquid in the hydraulic cylinder and transmission lines.

Disposed within the cylinder part 6b and located in advance of the acting end of the piston 7 when in the out of action position is a hydraulic packing in the form of a rubber annulus designated generally by the reference numeral 11 one face of which abuts an abutment ring 12 fixed within the cylinder, whereas the opposite face of the packing annulus 11 co-operates with a clamping ring 13 which tends to force the packing annulus 11 against the fixed abutment ring 12 under the influence of a spring 14 located in the cylinder part 6b and adapted to exert pressure on said clamping ring 13. The hole in the centre of the packing annulus 11 is of slightly less diameter than the external diameter of the acting end of the piston 7. The packing annulus 11 comprises a base portion 11a which is in contact with the wall of the cylinder part 6b and which incorporates a lip 11b which is forced into contact with the wall of the cylinder when pressure is generated. The portion 11d of the packing annulus 11 adjacent the hole therein is inclined inwardly and towards the closed end of the cylinder, the said inclined portion 11d being of lesser thickness than the portion adjacent the cylinder wall.

The acting end of the piston 7 is rounded as at 7a and when in the out of action position the piston 7 is free of the packing annulus 11.

The portion of the cylinder part 6b in advance of the packing annulus is provided with an outlet port 15 to the transmission lines 16 leading to the brake actuating mechanism.

It will be seen that as in the out of action position the piston 7 is free of the packing annulus 11 liquid can circulate freely from the liquid reservoir to the cylinder and transmission lines, thus ensuring that the system is maintained constantly filled with liquid.

When the piston 7 is actuated to generate pressure the piston 7 first travels a short distance before it presses against the wall of the hole in the packing annulus 11 and then moves through the said hole and during this movement through the hole in the packing annulus 11 the hydraulic pressure generated by the piston 7 causes the said annulus 11 to be distended into sealing contact with the piston 7 and with the cylinder wall. On the return stroke of the piston 7 if the pressure in the transmission lines becomes less than atmospheric pressure the greater pressure in the liquid reservoir causes the packing annulus 11 to be pressed out of sealing contact with the piston 7 to permit of the equalisation of pressure between the liquid reservoir and the transmission lines.

It will be appreciated that the two part construction of the cylinder facilitates the positioning of the packing annulus 11 and the general assembly of the transmission unit as a whole.

A transmission mechanism as hereinbefore described and as illustrated is utilised with a unit which as a whole is carried by a pedal lever 18 and the piston is adapted for direct operation by the foot. The piston 7 is returned to the out of action position by a spring 17 interposed between the toe piece 7b and the outer end of the part 6b.

In the modified construction illustrated in Figure III, instead of providing the cylinder wall with a plain annular groove 6c as in Figures I and II for affording communication between the rear end of the cylinder and the liquid reservoir the cylinder wall may incorporate an internal annular groove 6d and an external annular groove 6e with the connecting wall between the two grooves drilled with a plurality of radially arranged holes 6f and with the external groove 6e in communication with a passage 10 leading to the liquid reservoir. The return spring 17 in this case is located at one end in a hole in the acting end of the piston 7, the other end abutting the closed end of the part 6a.

Such a construction is shown in British patent specification No. 501,312, which corresponds to United States Patent No. 2,182,237 to Rasmussen.

In the modification illustrated in Figure IV the packing annulus 11 is provided with a concentric groove 11c and radial grooves 11e by means of which the passage 10 from the liquid reservoir is placed in comunication with the cylinder when the piston is in the extreme out of action position by way of ports 6g and an annular groove 6h.

As illustrated in Figure V the forward end of the piston 7 is stepped and the portion of greater diameter is located in a portion of the cylinder part 6b which itself is of greater internal diameter than the external diameter of the portion of the piston of greater diameter and the space between these complementary members is in communication by way of ports 6f and 6e with the passage 10.

It may be remarked here that there has been proposed heretofore hydraulic pressure applying means comprising in combination a cylinder having a fixed seal therein, a plunger reciprocable through the seal, a reservoir secured to the cylinder adjacent the seal, a one way valve opening from the reservoir to the high pressure side of the seal, a passage affording communication between the reservoir and the low pressure side of the seal, the plunger being constructed to afford communication between the high pressure side of the seal and the passage in the retracted position of the plunger.

The present invention is differentiated from the foregoing prior proposal in that the only communication between the reservoir and the cylinder is located to the rear of the fixed hydraulic packing means and in that the association between the said sealing means and the piston is such that the sealing means is moved out of sealing contact with the piston on the return stroke of the piston if the pressure in the cylinder becomes less than atmospheric pressure thus enabling liquid to flow from the reservoir into the cylinder irrespective of the position of the piston without the use of a one-way valve on the high pressure side of the fixed hydraulic packing means.

We claim:

1. A master cylinder for a hydraulic transmission system comprising an open ended member including a cylindrical chamber, a pressure piston having an inner end reciprocable between a position entirely outside said chamber and a position within said chamber to create hydraulic pressure on entry therein, an outlet from said chamber, an annular packing means mounted near the open end of said chamber and having a central opening slightly smaller than said piston, a hydraulic fluid reservoir, said member having a constantly open port forming the sole connection from said reservoir to the space within the member adjacent said chamber and located exteriorly of said packing means and through the central opening of the packing means to said chamber, the inner end of said piston being withdrawn out of contact with said packing means upon movement out of said chamber to freely admit fluid to the chamber and closing said central opening upon entry into the chamber to compress fluid therein, and a spring biased to resist entry of said piston into said chamber, the inner end of said piston being imperforate.

2. A master cylinder for a hydraulic transmission system comprising an open ended cylindrical chamber, a pressure piston reciprocable into and out of said chamber to create hydraulic pressure on entry therein, an outlet from said chamber, an annular packing means mounted near the open end of said chamber and having a central opening slightly smaller than said piston, the lip of said packing means being angularly directed inwardly relative to said chamber, a hydraulic fluid reservoir, a constantly open port forming the sole connection from said reservoir to said chamber and located exteriorly of said packing means, the inner end of said piston being withdrawn out of contact with said packing means upon movement out of said chamber, and a spring biased to resist entry of said piston into said chamber, the inner end of said piston being imperforate.

3. A master cylinder for a hydraulic transmission system comprising an open ended cylindrical chamber, a pressure piston reciprocable into and out of said chamber to create hydraulic pressure on entry therein, an outlet from said chamber, an annular packing means mounted near the open end of said chamber and having a central opening slightly smaller than said piston, the lip of said packing means being angularly directed inwardly relative to said chamber, a hydraulic fluid reservoir, a constantly open port forming the sole connection from said reservoir to said chamber and located exteriorly of said packing means, an annular groove cut in the wall of said chamber exteriorly of said packing means and communicating with said constantly open port, the inner end of said piston being withdrawn out of contact with said packing means upon movement out of said chamber, and a spring biased to resist entry of said piston into said chamber, the inner end of said piston being imperforate.

JAMES HENRY PRATT.
GILBERT EDGAR MANLEY.
ALBERT HENRY GODFREY GIRLING.

REFERENCES CITED

The following references are of record in the file of this patent:

UNITED STATES PATENTS

| Number | Name | Date |
|---|---|---|
| 1,943,886 | Carroll | Jan. 16, 1934 |
| 1,996,444 | Tatter | Apr. 2, 1935 |
| 1,998,821 | Rockwell | Apr. 23, 1935 |
| 2,102,834 | Carroll | Dec. 21, 1937 |
| 2,175,447 | Rike | Oct. 10, 1939 |
| 2,182,237 | Rasmussen | Dec. 5, 1939 |